United States Patent [19]
Edwards

[11] Patent Number: 5,235,935
[45] Date of Patent: * Aug. 17, 1993

[54] BIRD FEEDER

[76] Inventor: Roger P. Edwards, 1901 Lafayette Ave., Greensboro, N.C. 27407

[*] Notice: The portion of the term of this patent subsequent to Jun. 23, 2009 has been disclaimed.

[21] Appl. No.: 902,080

[22] Filed: Jun. 22, 1992

Related U.S. Application Data

[63] Continuation-in-part of Ser. No. 736,764, Jul. 29, 1991, Pat. No. 5,123,380.

[51] Int. Cl.$^5$ ............................................. A01K 39/00
[52] U.S. Cl. .................... 119/57.8; 119/52.3; D30/124
[58] Field of Search .............. 119/52.2, 52.3, 57.8, 119/57.9; D30/124, 125, 126, 127, 128

[56] References Cited

U.S. PATENT DOCUMENTS

| | | | |
|---|---|---|---|
| 4,201,155 | 5/1980 | Hyde | 119/57.8 |
| 4,215,652 | 8/1980 | Kerscher | 119/57.8 |
| 4,690,101 | 9/1987 | Kilham | 119/52.2 |
| 4,940,019 | 7/1990 | Coffer | 119/57.8 |

Primary Examiner—John G. Weiss
Attorney, Agent, or Firm—Rhodes, Coats & Bennett

[57] ABSTRACT

A bird feeder having a plurality of vertically spaced feed stations and a feed delivery system that, upon filling from the top, delivers a supply of feed to each feed station. The feed delivery system includes an inner supply tube or conduit arranged concentrically within an outer cylinder, which inner supply tube includes a plurality of vertically spaced delivery slots. As seed is supplied to the top of the outer cylinder, a substantial portion of the seed enters the inner supply tube and replenishes each feed station. In a preferred embodiment, various means are provided for equalizing the feed supply in the respective feed stations.

3 Claims, 2 Drawing Sheets

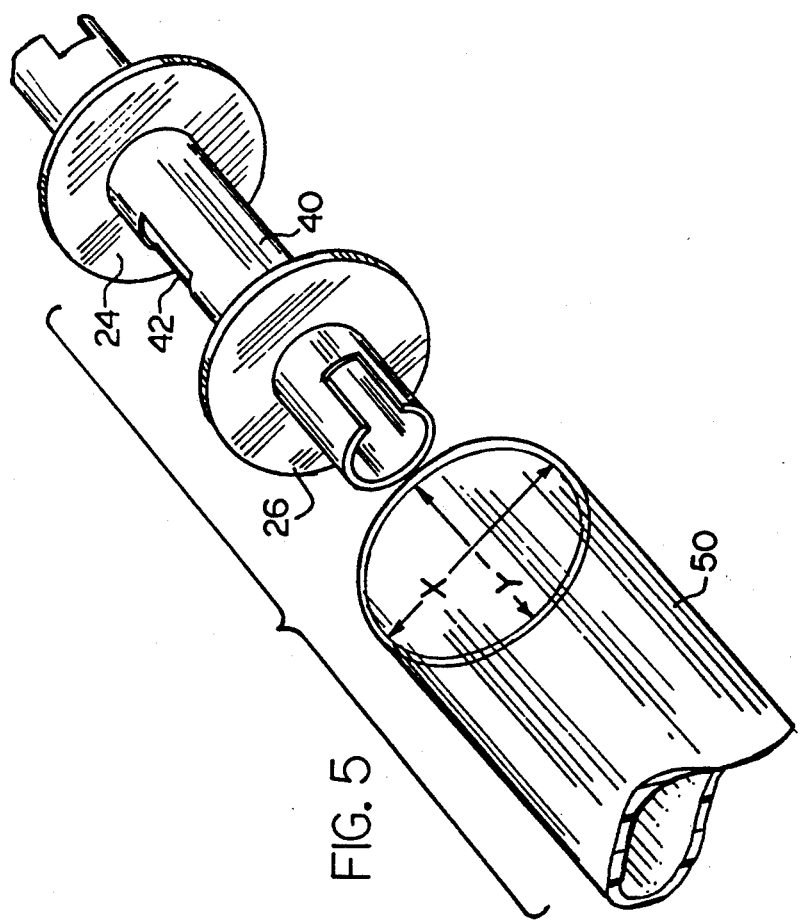
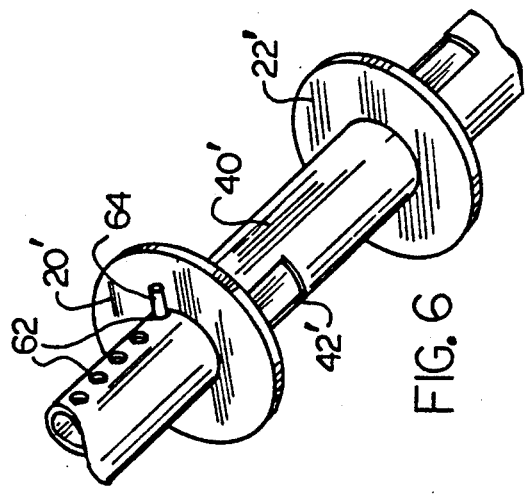

BIRD FEEDER

REFERENCE TO RELATED APPLICATIONS

This application is a continuation-in-part of my pending application Ser. No. 736,764 filed Jul. 29, 1991, now U.S. Pat. No. 5,123,380 issued Jun. 23, 1992.

BACKGROUND AND SUMMARY OF THE INVENTION

This invention is directed to bird feeders and, more particularly, to a seed delivery system for replenishing a plurality of vertically spaced feeding stations in said bird feeder. While the invention is described with respect to a thistle feeder (for thistle seed), it is also intended for use with more conventional bird feeders with larger feed apertures, such as, for example, sunflower seeds, conventional seed, and mixtures.

During recent years, there have been developed a number of types of bird feeders including many which supply feed apertures from a central supply of feed. Most of such bird feeders provide a central chamber which is filled, and a plurality of apertures in the side wall of said chamber through which birds can gain access to the feed therein.

A first type of bird feeder provides a plurality of apertures in the reservoir which contain the central supply of feed. However, the apertures are all located at or near the bottom of the feeder. Such a design limits the number of feeding apertures possible and, therefore the number of birds which can feed at any one time.

Later designs have developed in which the bird feeders are provided with vertically, and usually peripherally, spaced feeding apertures. One serious drawback with such bird feeders is that, as feed is depleted in the tubular housing, it quickly drops below the level of the upper feeding apertures. As a result, these apertures have no supply of feed and are therefore useless until the entire feeding apertures which may be utilized at any one particular time is limited, and the advantages which would have been offered by the multiple feeding stations is, for the most part, offset.

U.S. Pat. No. 4,201,155 to Hyde, Jr. is one attempt to address the aforedescribed problem. In the Hyde patent, there is provided a means for retaining a supply of feed at vertically spaced feeding stations which is, to some extent, independent of the level of the main supply in the housing. This is accomplished by providing a rectangular housing with a baffle member associated with each feed station. The baffle member retains a supply of feed for each station while allowing the remainder of the supply of feed to pass along to the feed stations thereunder. While the approach of Hyde partially addresses the problem, the problem is not fully solved, because the supply of feed retained at the upper feed stations is considerably less than that available at the lower feed station. Also, the Hyde concept appears to be compatible only with rectangular-shaped housings, while most of the suspended bird feeders today are formed of a cylindrical type.

Another type feeder which has developed in recent years includes three large tubes which can dispense three different types of seed. Each tube includes an upper and lower chamber and a delivery tube for delivering some of the seed in the upper chamber to the lower chamber. While this approach is also somewhat successful, it is limited to two vertically spaced chambers.

In the present invention, there is provided a bird feeder which overcomes many of the problems described hereinabove. The feeder of the present invention includes a plurality of vertically spaced feeding stations. There is no limit to the number of feeding stations which can be supplied by the approach of the present invention. The feeder of the present invention includes a hollow cylindrical or tubular tube with a plurality of vertically spaced feed apertures. A platform is provided immediately beneath each feed aperture to form a feed station. A feed supply tube or conduit extends axially down through all of the platforms with the exception of the lowermost platform. The feed supply tube includes a plurality of vertically spaced delivery slots therein which provide an egress for seed which is supplied through the feed supply tube to the lower feed stations. So long as the level of seed remains above the upper end or inside of the feed supply tube, seed will continuously be delivered equally to all of the feed station therebelow.

Successive ones of the delivery slots are spaced horizontally or peripherally around the feed supply tube. Perches may be provided on or through the walls of the cylindrical tube at appropriate positions for birds to receive feed from the feed opening thereabove. Since adjacent feed apertures are arranged transversely (or angularly) with respect to each other, the perches are also then peripherally spaced around the circumference of the cylindrical tube.

It is therefore an object of the present invention to provide an improved bird feeder.

It is another object of the present invention to provide a bird feeder of the type described in which a plurality of vertically spaced feed stations are maintained with a relatively equal supply of bird feed.

It is another object of the present invention to provide a bird feeder of the type described which is simple in design and extremely economical to manufacture.

Other objects and advantages will become apparent from reading the following detailed description of a preferred embodiment along with the accompanying drawings in which:

BRIEF DESCRIPTION OF THE DRAWING

FIG. 5 is a perspective view, with parts broken away and exploded, of an alternate form of the housing; and FIG. 6 is a perspective view, with parts broken away, illustrating an alternative form of the feed supply tube.

DETAILED DESCRIPTION OF THE PREFERRED EMBODIMENT

Figure 1:
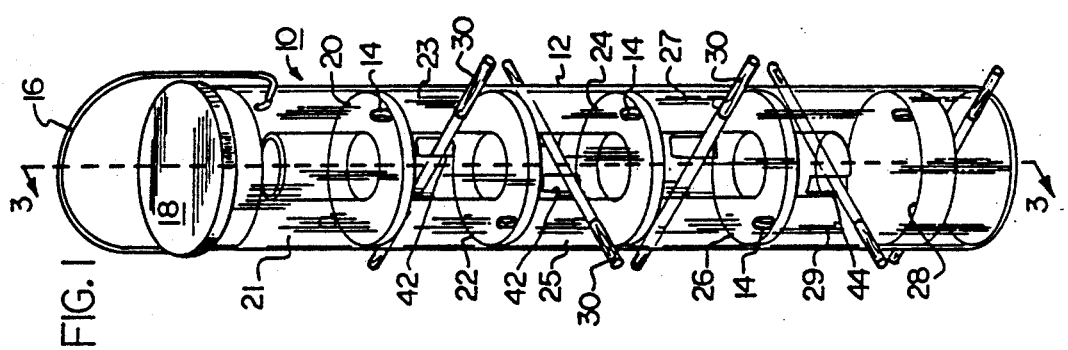
FIG. 1 is a perspective view of the bird feeder according to the present invention.

Turning now to the drawings, and first to FIG. 1, there is illustrated the bird feeder 10 constructed in accordance with the present invention. A generally cylindrical housing 12 (sometimes "housing") is preferably formed of some suitable material such as clear acrylic. A plurality of feed access openings 14 are provided through the wall of housing 12 at vertically spaced positions therein. Adjacent levels of openings 14 are also spaced or staggered around the periphery of the housing 12 for reasons to be described hereinafter. A bale or handle 16 is suitably attached to the upper end of cylindrical housing 12 for both carrying the feeder and for suspending it from some suitable point. A cap 18 covers the cylindrical housing 12 during times when the feeder is in use, and is only removed for refilling purposes.

While housing 12 is illustrated as being circular in cross-section, it should be noted that housing 12 may be other shapes. It may be oval, rectangular, or even polygonal. The outer configuration of housing 12 may also be tapered down from top to bottom.

A plurality of feed support platforms 20,22,24,26,28 are so positioned that one of the platforms will be disposed immediately beneath one (or an opposed pair) of the access openings 14 to provide a plurality of feed chambers 21,23,25,27,29. A perch 30 extends through housing 12 between diametrically opposed points in the wall thereof at a point appropriately spaced beneath each feed access opening 14.

Figure 4:
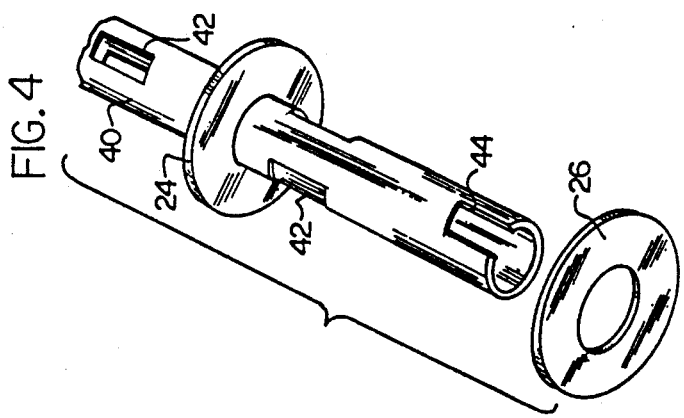
FIG. 4 is a perspective view of the hollow feed supply tube removed from the main cylinder.
Figure 3:
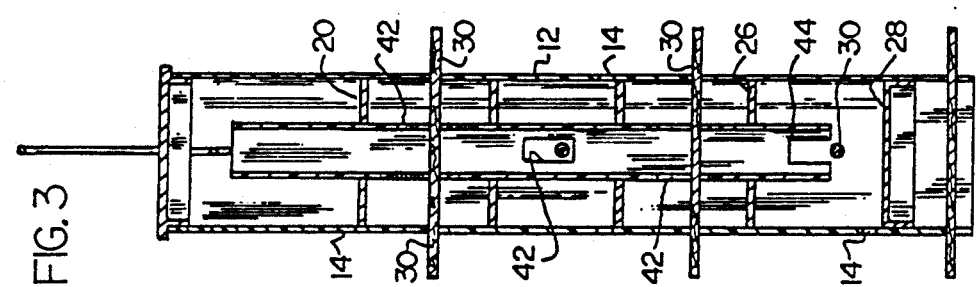
FIG. 3 is a sectional view taken substantially along lines 3—3 in FIG. 1.
Figure 2:
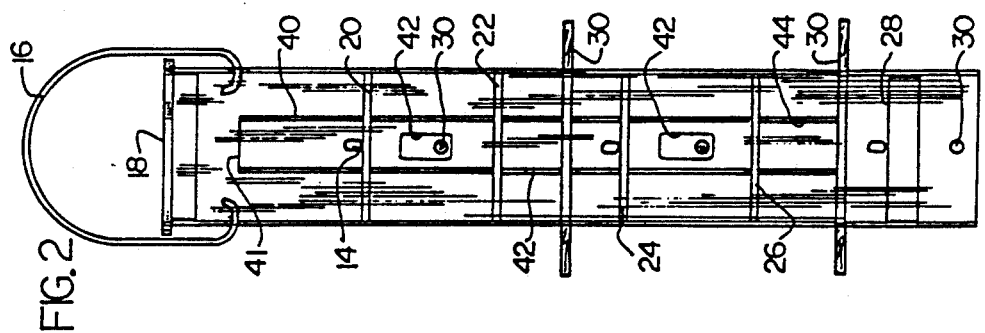
FIG. 2 is a side view of the bird feeder illustrated in FIG. 1.

As best illustrated in FIGS. 2 and 3, the hollow feed supply tube 40 (sometimes referred to as the "supply tube") is also formed of a clear acrylic material and has a cross-sectional dimension substantially less than that of the cylindrical housing 12. Supply tube 40 is slightly less in length than cylindrical housing 12 for reasons to be described hereinafter. The aforementioned platforms 20,22,24,26,28 may be secured by suitable adhesive both to the outer circumference of the supply tube 40 and to the inner surface of the cylindrical housing 12 at appropriate positions. Preferably, the platforms 20,22,24,26 are secured to the outer surface of supply tube 40 and the lower end of supply tube 40 rests on the perch 30 which extends through the lowermost feed station 29 to retain the supply tube in position within outer housing 12. So arranged, the platforms, supply tube 40 and outer cylindrical tube 12 form discreet feed chambers 21,23,25,27,29. It is the continuous supply and maintenance of feed in the plurality of feed chambers which is the object of this invention.

Another assembly technique, as illustrated in FIG. 5, is to use a cylinder that is of approximately the same inner circumference as that of platforms 20,22,24,26, but which is oval in shape. In this regard, note that the x-axis is slightly greater than the y-axis. To assemble the feeder, the platforms are secured to the outer surface of supply tube 40. The cylinder is them compressed along its longest diametrical dimension. After the platforms and supply tube are inserted, the pressure is released and the cylinder tends to return to its oval configuration, holding the platforms by frictional engagement.

A slot 42 is cut in diametrically opposed sides of inner feed supply conduit 40 in each of feed chambers 21,23,25,27,29. The slots 42 are preferably staggered at 90° angles, so that the perches 30, which extend therethrough, may be positioned at a 90° angle with respect to the perches immediately above and below. In addition to providing an egress for seed from the supply conduit 40 into the feed stations, the slots 42 provide for the insertion of perches 30 completely through the cylindrical housing 12, if desired. However, the perches can also merely be secured to the outer surface of housing 12 at appropriate locations according to conventional attachment techniques. In the lowermost feed chamber 29, as the feed conduit 40 is shortened, the slot 44 is also shortened. The feed conduit 40 may extend to the lowermost feed station 29 a sufficient distance to that the lower edge thereof rests on the perch 30 extending therethrough. Alternatively, if the periphery of the platforms 20,22,24,26 are adequately secured to the inner surface of the outer cylindrical housing 12, the lowermost portion of the feed conduit 40 which extends into the lowermost feed chamber 29 can be eliminated.

In use, assuming the feeder is empty, the cap 18 is removed and a supply of bird seed is introduced into the upper end thereof. The upper end 41 of supply tube 40 merely determines the level of seed which will be available in the upper feed chamber 21 because, as the seed is emptied into the housing 12, the excess seed in upper chamber 21 will begin to fill the conduit 40. Gravity will cause the majority of the seed to then fill the lowermost chamber 29 next. When lower chamber is filled, the seed then exit through the slot 42 in the next lowest feed chamber 27. When feed chamber 27 is full, the seed will then fill chamber 25, and so forth, until all feed chambers and the housing 12 are full. Supply of bird seed is then stopped, and the cap replaced. The bird feeder is then suspended by bale 16 or otherwise mounted for operation.

As birds perch on perches 30 and acquire seed through the feed openings 14, the supply of seed in each feed compartment will begin to dwindle. However, since each feed compartment has its own floor (in the form of one of platforms 20–28) assuming the same amount of seed is removed from each compartment, each compartment will remain at substantially the same level throughout use. When all compartments become substantially empty, the cap is removed and the filling process is repeated. So long as the feed conduit 40 is full and/or seed remains above the upper level of feed conduit 40, the lower feed stations will continue to be replenished. Once the seed in feed conduit 40 has dropped below the level of the slot 42 in feed chamber 23, obviously no more will be replenished. Therefore, while the upper chambers will empty somewhat sooner than the others, the equalization of the feed supply is much improved over feeders known heretofor.

In alternate forms of the invention, the feed supply may be even further equalized several ways. One is to vary the distance of the lower edge of the slots 42 from the surface of the platforms therebeneath in the different stages. Thus, if the lower edge of slot 42 is a greater distance from platform 20 in the next lower chamber 23, then the upper chamber will retain more feed when the supply has been exhausted, even though the next lower chamber will be replenished for a longer period of time. By this technique, the feed supply is even more equalized than in the illustrated embodiment. Another approach would be to make each feed station progressively larger in volume than the one immediately below so, that as the feed supply began to diminish in the feed supply tube 40, the upper stations would have a greater retained supply. This can be done by varying the height of each chamber or by tapering the housing with the larger cross-section at the top and the smaller cross-section at the bottom.

The position of slots 42 can also be adjusted by fixing the platforms 20–26 with respect to the housing wall and by adjusting the position of supply tube 40 with relation thereto. Such an arrangement is illustrated in FIG. 6. A plurality of holes 62 are provided along the length of tube 40' immediately about the upper platform 20, A stop 64 in the form of a screw or dowel is inserted in one of the holes 62 to provide a means for limiting or determining the position of supply tube 40' and its delivery slot 42' with respect to the chambers 21,23,25,27,29 and platforms 20,22,24,26.

While the present invention is described the reference to a cylindrical housing 12, the concept is compatible with housings of other cross-sectional shapes, e.g., elliptical or rectangular. While the outer housing 12 should be transparent, the supply tube 40 and platforms 20-26 may be of any color or material, even metal.

While the invention has been described as being inclusive of the housing 12 and perches 30, it would be possible to commercialize the invention as a modification kit for existing tubular feeders. Toward this end, a feed supply tube 40 with platforms 22,24,26,28 secured thereto could be marketed as a conversion kit. Then the purchaser could remove the top 18 of their existing feeder, remove perches 30 (if required), insert the conversion kit, replace the perches and top, and the conversion would be complete.

While a preferred embodiment of the invention has been described in detail hereinabove, it is apparent that various changes and modifications might be made without departing from the scope of the invention which is set forth in the accompanying claims.

What is claimed is:

1. A bird feeder comprising a hollow tubular housing having a plurality of vertically spaced feed access openings therein, means for positioning and maintaining said tubular housing with its longitudinal axis extending vertically, a plurality of vertically spaced platforms fixed within said housing forming discreet chambers or feed stations, each of said platforms being of substantially the same cross-sectional size and configuration as the inner surface of said tubular housing, an inner feed delivery means extending down through said platforms and the central portion of said tubular housing for replenishing continuous prescribed supply of seed upon provision of a new supply of seed at the upper end of said tubular housing.

2. The bird feeder according to claim 1 wherein said feed delivery means comprises a hollow feed supply tube extending down through said vertically spaced platforms and including a delivery slot therein corresponding to at least some of said feed stations, the upper edge of said delivery slot determining the amount of seed a feed station will hold and the lower edge of said delivery slots determining the amount of seed retained in a feed station when the supply is cut off.

3. The bird feeder according to claim 2 and further including means for adjusting the position of said delivery slot with respect to said vertically spaced platforms.

* * * * *